US010377192B2

(12) United States Patent
Unterreiner et al.

(10) Patent No.: US 10,377,192 B2
(45) Date of Patent: Aug. 13, 2019

(54) METHOD AND CONTROL DEVICE FOR DETERMINING A TIRE TEMPERATURE

(71) Applicant: Dr. Ing. h.c. F. Porsche Aktiengesellschaft, Stuttgart (DE)

(72) Inventors: Michael Unterreiner, Stuttgart (DE); Florian Büttner, Eisenach (DE); Malte Thomann, Oelde (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 491 days.

(21) Appl. No.: 15/214,925

(22) Filed: Jul. 20, 2016

(65) Prior Publication Data

US 2017/0021682 A1 Jan. 26, 2017

(30) Foreign Application Priority Data

Jul. 24, 2015 (DE) ........................ 10 2015 112 136

(51) Int. Cl.
*B60C 23/20* (2006.01)

(52) U.S. Cl.
CPC .................................... *B60C 23/20* (2013.01)

(58) Field of Classification Search
CPC ................................ B60C 13/20; B60C 23/20
See application file for complete search history.

(56) References Cited

U.S. PATENT DOCUMENTS 6,624,748 B1 * 9/2003 Phelan ................ B60C 23/0493 152/152.1
7,075,421 B1 * 7/2006 Tuttle ...................... B60C 23/04 152/152.1
9,636,955 B2 * 5/2017 Singh ...................... B60C 23/20

FOREIGN PATENT DOCUMENTS

DE 102012209039 1/2013

OTHER PUBLICATIONS

Buttner et al., "An effective method to identify thermodynamic tire charcteristics through driving maneuvers", 15 Internationales Stuittgarter Symposium Proceedings, 2015, pp. 123-138.
German Search Report for German Application No. 10 2015 112 136.0, dated Feb. 16, 2016 with partial translation.

* cited by examiner

*Primary Examiner* — Mohamed Charioui
(74) *Attorney, Agent, or Firm* — RatnerPrestia

(57) ABSTRACT

A method for determining a temperature of a tire of a motor vehicle, specifically a temperature of an inner liner of the respective tire, having at least the following steps: a saturation temperature is determined for the inner liner of the respective tire as a function of an ambient temperature, as a function of a temperature of the inflation air of the respective tire and as a function of vehicle movement dynamics variables; the temperature of the inner liner of the respective tire is determined by integration as a function of the determined saturation temperature of the inner liner of the respective tire.

8 Claims, 3 Drawing Sheets

METHOD AND CONTROL DEVICE FOR DETERMINING A TIRE TEMPERATURE

CROSS-REFERENCE TO RELATED APPLICATIONS

This application claims priority to German Patent Application No. 10 2015 112 136.0, filed Jul. 24, 2015, which is incorporated by reference herein in its entirety.

FIELD OF THE INVENTION

The invention relates to a method for determining a temperature of a tire of a motor vehicle, specifically a temperature of an inner liner of the respective tire. Furthermore, the invention relates to a control device for carrying out the method.

BACKGROUND OF THE INVENTION

During the operation of a motor vehicle, the temperature of tires of the motor vehicle change as a function of operating conditions of said motor vehicle. On the one hand, energy is input into the tire as a function of vehicle movement dynamics variables, and on the other hand the tire outputs energy as a function of a difference in temperature with respect to the ambient temperature.

A tire has a design which is basically known from practical experience. For example, a tire has a steel belt with a belt cover which is positioned on the outside of the steel belt, wherein the so-called tread of the tire joins the outside of the belt cover of the steel belt. The inside of the steel belt is adjoined by what is referred to as an inner liner which keeps the tire sealed and is typically embodied as a rubber layer. In the dynamic travel mode, the outer tread of the tire typically has a different temperature than the inner liner of the tire in this context.

DE 10 2012 209 039 A1, which is incorporated by reference herein, discloses a method in which an active chassis system of a motor vehicle is set as a function of a value of a tire temperature, wherein the value of the tire temperature is determined using at least one sensor. The chassis system may be, for example, an anti-lock brake system.

As already stated, a tire has different assemblies, such as, for example, the tread and the inner liners which can have different temperatures in the dynamic travel mode. It is particularly advantageous if the temperature of the inner liner of the tire is known.

Infrared sensors for determining the temperature of the inner liner of a tire are known from motor racing, wherein such an infrared sensor is installed in the region of each tire, and the temperature of the inner liner of said tire can be detected by measuring equipment in the region of each tire. Such infrared sensors for detecting the temperature of the inner liner of the respective tire with measuring equipment, as is known from motor racing are, however, very expensive, with the result that the use of such infrared sensors is not practical in series-manufactured vehicles.

There is therefore a need to determine the temperature of an inner liner of a tire of a motor vehicle in a cost-effective way, specifically without the need for expensive infrared sensors.

SUMMARY OF THE INVENTION

Taking the foregoing as a basis, described herein is a method for determining a temperature of a tire of a motor vehicle, specifically a temperature of an inner liner of the respective tire, and a control device for carrying out the method.

According to aspects of the invention, a saturation temperature is determined for the inner liner of the respective tire as a function of an ambient temperature, as a function of a temperature of the inflation air of the respective tire and as a function of vehicle movement dynamics variables. The temperature of the inner liner of the respective tire is determined as a function of the determined saturation temperature of the inner liner of the respective tire, by means of adjustment using an integration controller. The present invention here proposes a method which can be used to determine the temperature of the inner liner of a tire easily, reliably and cost-effectively. A saturation temperature for the inner liner of the respective tire is determined first, specifically as a function of vehicle movement dynamics variables of the motor vehicle as well as a function of the inflation air temperature and the ambient temperature of the respective tire. The temperature of the inner liner is then determined from this specific saturation temperature of the inner liner, specifically by means of integration. This permits simple, reliable and cost-effective determination of the temperature of the inner liner of a tire without the need for expensive infrared sensors.

The saturation temperature of the inner liner of the respective tire is preferably determined as a function of a current ambient air temperature, as a function of a current temperature of the inflation air of the respective tire as well as a function of a current longitudinal acceleration, a current lateral acceleration of the motor vehicle and as a function of a current velocity of the motor vehicle. The saturation temperature of the inner liner, and therefore ultimately the temperature thereof, can then be determined particularly advantageously if the longitudinal acceleration and lateral acceleration and velocity of the motor vehicle are taken into account as vehicle movement dynamics variables in the determination of the saturation temperature of the inner liner.

The saturation temperature of the inner liner of the respective tire is preferably determined as a function of a sampling rate at every sampling time thereof, wherein, in the context of the adjustment, the integration takes place discretely at each sampling time of the sampling rate in order to determine the temperature of the inner liner of the respective tire. This is particularly advantageous for the control-side integration of the determination of the temperature of the inner liner.

According to one advantageous development, the saturation temperature of the inner liner of the respective tire is determined in such a way that an axle-specific reference saturation temperature for the inner liners of the tires of the respective axle is determined as a function of the ambient temperature for each axle of the motor vehicle; in that, for each tire, a difference is determined between the axle-specific reference saturation temperature and a tire-specific inflation air temperature of the respective tire; in that, for each tire, this difference is offset against at least one variable, dependent on the longitudinal acceleration of the motor vehicle, the lateral acceleration of the motor vehicle and the velocity of the motor vehicle, for the determination of a weighted difference; in that for each tire, this weighted difference is offset against the respective tire-specific inflation air temperature of the respective tire, in order to determine the saturation temperature of the inner liner of the respective tire. This permits particularly advantageous determination of the saturation temperature of the inner liner of each tire and therefore ultimately permits particularly advantageous determination of the temperature of the inner liner of each tire as a function of the saturation temperature.

According to a further advantageous development, the integration of a difference between the saturation temperature of the inner liner of the respective tire and the calculated temperature of the inner liner of the respective tire is carried out for each tire. Such integration is particularly advantageous for determining the temperature of the inner liner of the respective tire.

The above-mentioned control device is a control device for determining a tire temperature of a tire of a motor vehicle, specifically a temperature of an inner liner of the respective tire, wherein: the control device determines a saturation temperature as a function of an ambient temperature, as a function of a temperature of the inflation air of the respective tire and as a function of vehicle movement dynamics variables for the inner liner of the respective tire, the control device determines the temperature of the inner liner of the respective tire as a function of the calculated saturation temperature of the inner liner of the respective tire by integration.

BRIEF DESCRIPTION OF THE DRAWINGS

Exemplary embodiments of the invention are explained in more detail on the basis of the drawing, without being restricted thereto.

In the drawing.

DETAILED DESCRIPTION OF THE INVENTION

The present invention here relates to a method for determining a temperature of a tire of a motor vehicle, specifically the temperature of an inner liner of the respective tire. The temperature of the inner liner is preferably determined individually for each tire. Furthermore, the invention relates to a control device for carrying out the method, that is to say to a control device with which the temperature of the inner liner of a tire can be determined.

Figure 1:
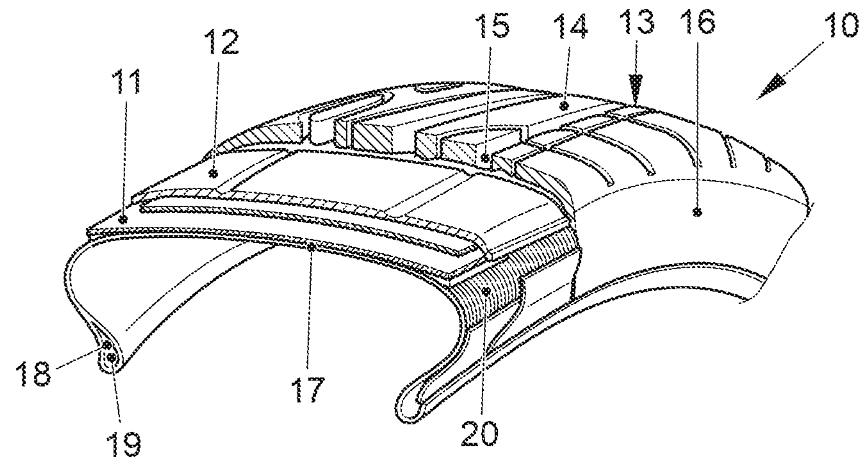
FIG. 1 shows a block diagram clarifying the method according to aspects of the invention for determining a tire temperature.

FIG. 1 illustrates the design of a tire 10 of a motor vehicle which is known from the prior art. A tire 10 therefore has a steel belt 11 with a steel belt cover 12, wherein the steel belt cover 12 is positioned between the steel belt 11 and a tread 13 of the tire 10. The tread 13 has a multiplicity of profile blocks 14 which are separated from one another by profile grooves 15. The tread 13 brings about the contact with the road surface and is limited laterally by the so-called side wall 16 of the tire 10. The inside of the steel belt 11 of the tire 10 is adjoined by the so-called inner liner 17 of the tire, which inner liner 17 is typically embodied as a rubber layer and keeps the tire 10 sealed. In addition, FIG. 1 shows a so-called core rider 18, a so-called bead core 19, and a so-called carcass 10 of the tire 10. As already stated, the basic design of a tire 10 which is shown in FIG. 1 is familiar to the relevant person skilled in the art.

The present invention here relates to a method and to a control device which can be used, preferably in the region of each tire 10 of a motor vehicle, to determine the temperature of the inner liner 17 of the respective tire 10 in a reliable way with simple means. In order to determine the temperature of an inner liner 17 of a respective tire 10, a saturation temperature is firstly determined as a function of an ambient temperature, as a function of a temperature of the so-called inflation air of the respective tire 10 and as a function of vehicle movement dynamics variables of the motor vehicle for the inner liner 17 of the respective tire 10. The temperature of the inner liner 17 of the respective tire 10 is determined by integration as a function of the saturation temperature of the inner liner 17 of the respective tire 10 which is determined in this way.

Figure 2:
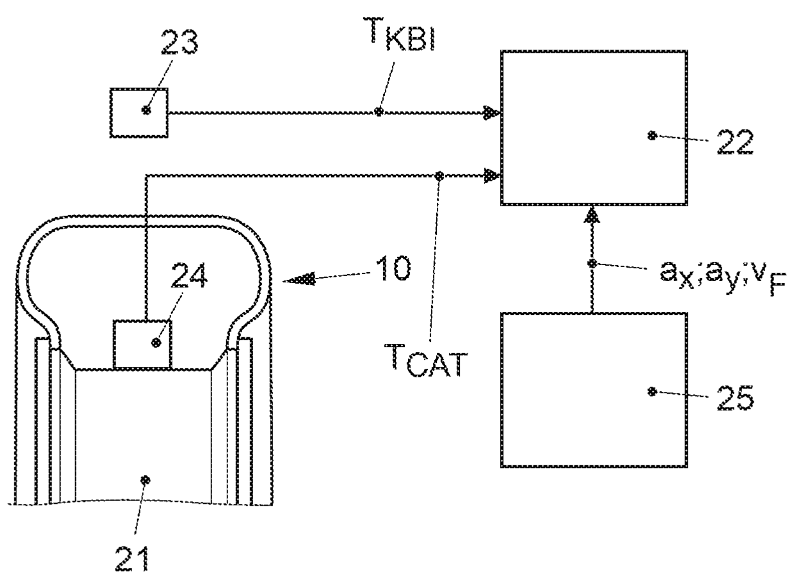
FIG. 2 shows a tire in cross section.

FIG. 2 shows a highly schematic block diagram which illustrates the invention. For example, FIG. 2 shows a tire 10 which is fitted on a rim 21. In addition, FIG. 2 shows a control device 22, wherein an ambient temperature of the ambient air is made available to the control device 22 as an input variable by a first temperature sensor 23. The temperature of the inflation air of the tire 10 is made available as a further input variable to the control device 22 by a second temperature sensor 24. A vehicle movement dynamics system 25 provides further input variables, specifically vehicle movement dynamics variables, to the control device 22. The control device 22 determines the saturation temperature of the inner liner 17 of the respective tire 10 as a function of the ambient air temperature made available by the sensor 23, as a function of the inflation air temperature made available by the sensor 24 as well as as a function of the vehicle movement dynamics variables made available by the vehicle movement dynamics system 25. In addition, the control device 22 performs integration as a function of the determined saturation temperature of the inner liner 17 of the respective tire 10, in order ultimately to determine the temperature of the inner liner 17 of the respective tire 10 as a function of this integration.

Figure 3:
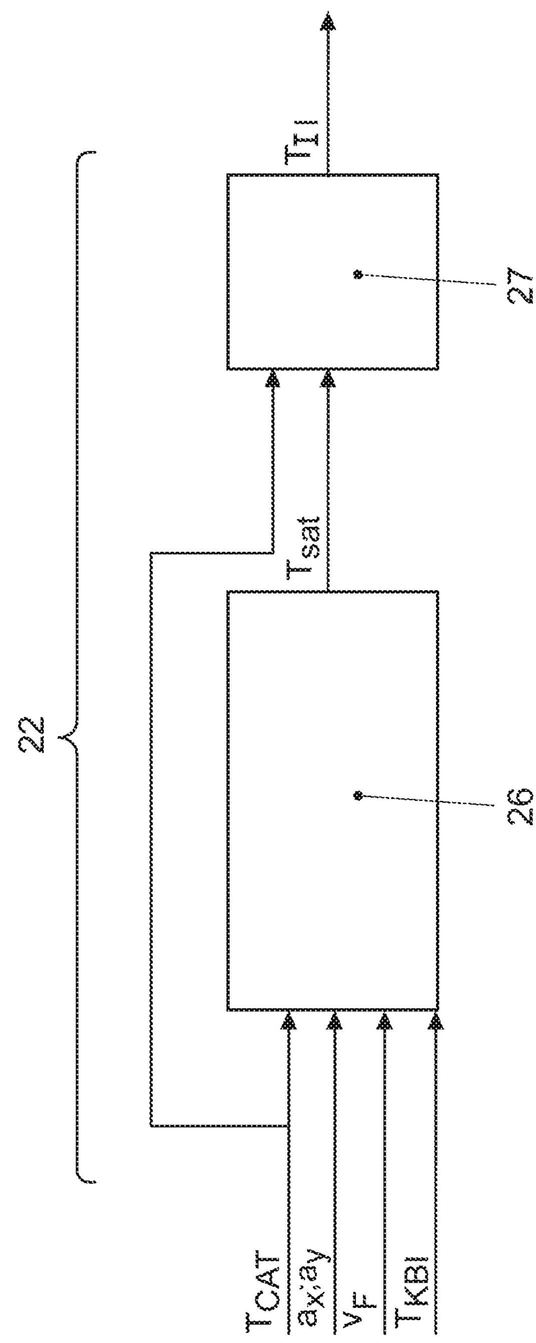
FIG. 3 shows a block diagram further clarifying the method according to aspects of the invention.

FIG. 3 shows a further block diagram which visualizes the function of the control device 22 and therefore of the method according to aspects of the invention, wherein in block 26 of FIG. 3 the saturation temperature of the inner liner 17 of a tire 10 is determined. Various input variables, specifically the ambient air temperature $T_{KBI}$ as a first input variable, the inflation air temperature $T_{CAT}$ of the respective tire 10 as a second input variable, and specifically a longitudinal acceleration $a_x$, a lateral acceleration $a_y$ and a velocity $v_F$ of the motor vehicle as vehicle movement dynamics variables of the motor vehicle, are fed to the block 26.

The saturation temperature $T_{sat}$ of the inner liner 17 of the tire 10 is determined as a function of these input variables in the block 26, wherein this saturation temperature $T_{sat}$ is fed as an input variable to a block 27, specifically together with the inflation air temperature $T_{CAT}$. In the block 27, the temperature $T_{Il}$ of the inner liner 17 of the tire 10 is determined by integration.

As already stated, the temperature of the inner liner of a tire is preferably determined individually for each tire 10 of the vehicle. This is shown in the block diagram in FIG. 4, wherein the indices FL, FR, RL and RR stand for the four tires of a motor vehicle, specifically the index FL (front left) for the front left tire, the index FR (front right) for the front right tire, the index RL (rear left) for the rear left tire and the index RR (rear right) for the rear right tire of the motor vehicle.

Figure 4:
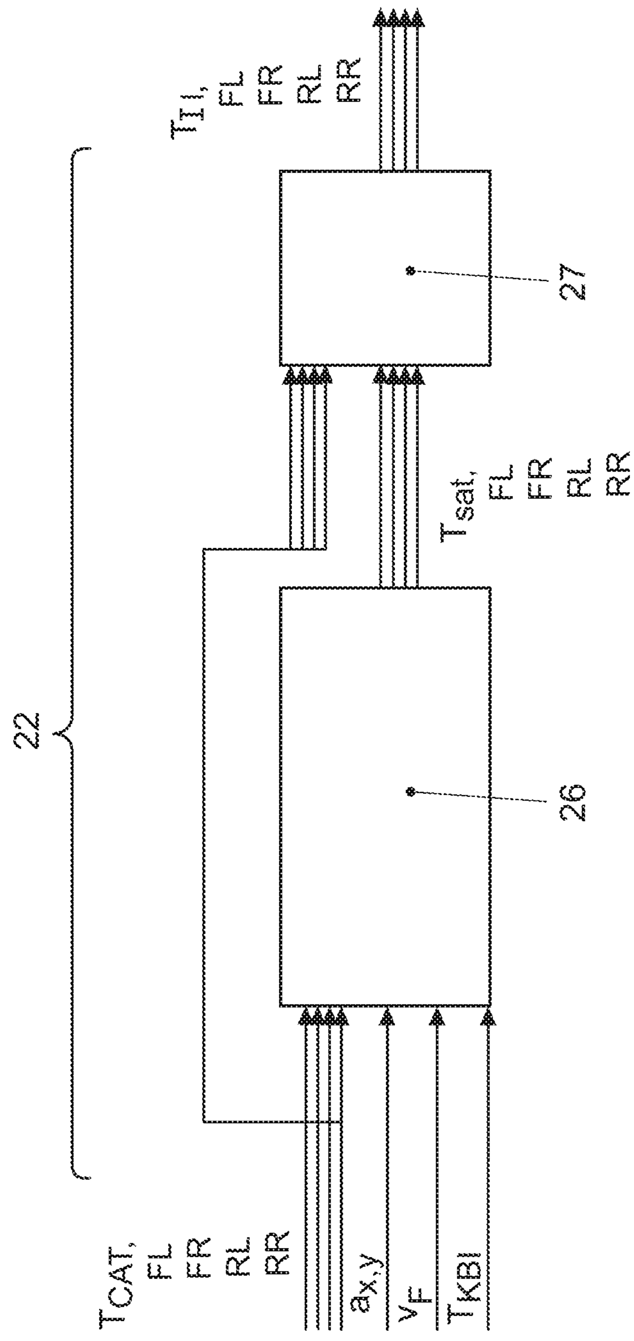
FIG. 4 shows a block diagram for further clarifying the method according to aspects of the invention.

It follows from FIG. 4 that accordingly, in addition to the ambient air temperature $T_{KBI}$ which is the same for all the tires and the vehicle movement dynamics variables of the longitudinal acceleration $a_x$, lateral acceleration $a_y$ and velocity $v_F$, the tire-specific inflation air temperatures $T_{CAT,FL}$, $T_{CAT,FR}$, $T_{CAT,RL}$ and $T_{CAT,RR}$ are accordingly made available as input variables to the block 26, wherein an individual saturation temperature $T_{sat,FL}$, $T_{sat,FR}$, $T_{sat,RL}$ and $T_{sat,RR}$ of the inner liner 17 of the respective tire 10 is then determined for each tire in the block 26.

In block 27, the respective temperature $T_{Il,FL}$, $T_{Il,FR}$, $T_{Il,RL}$ and $T_{Il,RR}$ of the respective inner liner 17 is then determined individually, that is to say in each case individually for the four tires FL, FR, RL and RR of the motor vehicle, by integration for each tire.

The temperature of the inner liner 17 of the respective tire 10 is preferably determined in such a way that firstly the saturation temperature $T_{sat,FL}$, $T_{sat,FR}$, $T_{sat,RL}$ and $T_{sat,RR}$ of the inner liner 17 of the respective tire 10 is determined as a function of a sampling rate of the control device 22 at each sampling time of said sampling rate, specifically, as stated above, as a function of the current ambient air temperature $T_{KBI}$, as a function of the current inflation air temperature $T_{CAT,FL}$, $T_{CAT,FR}$, $T_{CAT,RL}$ and $T_{CAT,RR}$ of the respective tire 10 as well as a function of current vehicle movement dynamics variables, specifically as a function of the current longitudinal acceleration $a_x$, the current lateral acceleration $a_y$ and the current velocity $v_F$ of the motor vehicle. In addition, the temperature of the inner liner 17 of the respective tire 10 is determined at each sampling time of the same rate by discrete integration.

The saturation temperature of the inner liner 17 of the respective tire 10 is preferably determined in such a way that firstly an axle-specific reference saturation temperature for the inner liners 17 of the tires 10 of the respective axle is determined for each axle of the motor vehicle, that is to say for the front axle and rear axle thereof, as a function of the ambient air temperature. For each tire 10, a difference is then determined between the axle-specific reference saturation temperature and a tire-specific inflation air temperature of the respective tire 10. For each tire 10, this difference is offset against at least one variable which is dependent on the longitudinal acceleration, the lateral acceleration and the velocity of the motor vehicle, in order to determine a weighted difference. For each tire 10, this weighted difference is offset against the respective tire-specific inflation air temperature of the respective tire 10, in order thereby to determine the saturation temperature of the inner liner 17 of the respective tire 10.

The saturation temperature $T_{sat,ii}$ of the inner liner 17 of the respective tire 10 is preferably determined for each tire 10 in accordance with the following equation:

$$T_{sat,ii}=(T_{sat,ref,j}(T_{KBI})-T_{CAT,ii})\cdot f_{DYN\text{-}1}\cdot f_{load,ii}\cdot f_{tire}\cdot (v_F>v_{F,min})+T_{CAT,ii}$$

where $_{sat,ref,j}(T_{KBI})$ is the axle-specific reference saturation temperature, dependent on the ambient temperature $T_{KBI}$, for the inner liners 17 of the tires 10 of the respective axle j, wherein j=F stands for the front axle, and j=R stands for the rear axle. $T_{CAT,ii}$ is the tire-specific inflation air temperature which is measured by the respective sensor 24, of the respective tire 10, wherein ii=FL stands for the front left tire, ii=FR stands for the front right tire, ii=RL stands for the rear left tire and ii=RR stands for the rear right tire.

The variables $f_{DYN\text{-}1}$ and $f_{load,ii}$ are each variables which are dependent on at least one vehicle movement dynamics variable and which serve to weight the difference between the axle-specific reference saturation temperature $T_{sat,ref,j}$ $(T_{KBI})$ and the tire-specific inflation air temperature $T_{CAT,ii}$.

The variable $f_{tire}$ is a constant characteristic variable which is dependent on the type of tire and is stored in the control device.

A term $(v_F>v_{F,min})$ is a logic operator which assumes either the value 1 or the value 0, wherein this logic operator assumes the value 1 when the current velocity $v_F$ is higher than the limiting value $v_{F,min}$, and wherein this logic operator assumes the value 0 when the current velocity $v_F$ is below the limiting value $v_{F,min}$.

For the axle-specific reference saturation temperature $T_{sat,ref,j}(T_{KBI})$ for the inner liners 17 of the tires 10 of the respective axle j the following linear relationship applies as a function of the measured ambient air temperature $T_{KBI}$:

$$T_{sat,ref,j}(T_{KBI}) = \left(\frac{dT_{sat,ref,j}}{dT_{KBI}}\right)\cdot T_{KBI} + T_{sat,ref,j@0^\circ C.}$$

where the gradient $(dT_{sat,ref,j}/dT_{KBI})$ and the axle section $T_{sat,ref,j@0^\circ C.}$ for the above straight line have been determined empirically and are stored in the control device 22. The axle section $T_{sat,ref,j@0^\circ C.}$ is the reference saturation temperature at 0° C. of the ambient air temperature.

The first variable $f_{DYN\text{-}1}$ which is dependent on the longitudinal acceleration $a_x$ and the lateral acceleration $a_y$, for weighting the difference between the axle-specific reference saturation temperature $T_{sat,ref,j}(T_{KBI})$ and the tire-specific inflation air temperature $T_{CAT,ii}$ is determined according to the following equations:

$$F_{DYN-1} = \left(\frac{a_{res}(a_x, a_y)}{a_{res,ref}}\right) \quad a_{res}(a_x, a_y) = \sqrt{a_x^2 + a_y^2}$$

where $a_{res,ref}$ is a constant reference acceleration which is stored in the control device 22.

The second variable $f_{load,ii}$ which is dependent on the longitudinal acceleration $a_x$ and the lateral acceleration $a_y$, for weighting the difference between the axle-specific reference saturation temperature $T_{sat,ref,j}(T_{KBI})$ and the tire-specific inflation air temperature $T_{CAT,ii}$ is determined according to the following equations:

$$f_{load,ii} = \frac{F_{Z,dyn,ii}(a_x, a_y)}{F_{Z,stat,ii}}$$

$$F_{Z,dyn,ii}(a_x, a_y) = F_{Z,stat,ii} \pm \frac{a_x \cdot h_{cog} \cdot m}{l_{wb} \cdot 9.81 \cdot 2} \pm \frac{a_y \cdot h_{cog} \cdot m}{l_{tw} \cdot 9.81 \cdot 2}$$

where $F_{z,stat,ii}$ is a wheel-specific, static wheel load, where m is the total weight of the motor vehicle, where $h_{cog}$ is the height of the central gravity of the motor vehicle, where $I_{wb}$ is the wheel base of the motor vehicle and where $I_{tw}$ is the track width of the motor vehicle. These variables are stored in the control device 22. $F_{z,dyan,ii}$ is a wheel-specific, dynamic wheel load which is dependent on the accelerations $a_x$, $a_y$.

In the above equation for the dynamic wheel load $F_{z,dyan,ii}$, the term which relates to the longitudinal acceleration $a_x$ is valid for the wheels FL and FR of the front axle with the minus operator, and is valid for the wheels RL, RR of the rear axle with the plus operator. In the equation for the dynamic wheel load $F_{z,dyan,ii}$, the term which relates to the lateral acceleration $a_y$ is valid for the left wheels FL and RL with the minus operator, and is valid for the right wheels FR, RR with the plus operator.

By using the above equations, the saturation temperature $T_{sat,ii}$ of the inner liner 17 of the respective tire 10 can be determined individually, easily and reliably for each tire 10 of a motor vehicle.

An alternative equation for determining the saturation temperature $T_{sat,ii}$ of the inner liner 17 of each tire 10 of a motor vehicle is given below, wherein the following equation differs from the equation given above only in the weighting factor $f_{DYN-2}$.

$$T_{sat,ii} = (T_{sat,ref,j}(T_{KBI}) - T_{CAT,ii}) \cdot f_{DYN-2} \cdot f_{laod,ii} \cdot f_{tire} \cdot (v_F > v_{F,min}) + T_{CAT,ii}$$

$$f_{DYN-2} = \left(p \cdot \frac{a_{res}(a_x, a_y)}{a_{res,ref}} + (1-p) \cdot \frac{v_F}{v_{F,ref}}\right)$$

The weighting factor $f_{DYN-2}$ for weighting the difference between the axle-specific reference saturation temperature $T_{sat,ref,j}(T_{KBI})$ and the tire-specific inflation air temperature $T_{CAT,ii}$ is dependent not only on the current lateral acceleration $a_y$ and current longitudinal acceleration $a_x$ of the motor vehicle but rather also on the current velocity $v_F$.

The factor p corresponds to a division factor which defines the influence of accelerations and of the speed on the determination of the saturation temperature of the inner liner of the respective tire. p can assume here a value between 0 and 1, wherein when p=1, $f_{DYN-2}$ corresponds to the weighting factor $f_{DYN-1}$ which has already been mentioned above. $v_{F,ref}$ is a constant reference speed which is stored in the control device 22.

There are no differences with respect to all other variables and equations.

The determination of the temperature $T_{Il,ii}$ of the inner liner 17 of the respective tire 10 is carried out, as already stated, for each tire 10 using an integration, wherein the integration for a difference $e_{ii}$ between the saturation temperature $T_{sat,ii}$, determined in the above manner, of the inner liner of the respective tire 10 and the temperature $T_{Il,ii}$ of the inner liner 17 of the respective tire 10 is carried out, specifically at each sampling time t of the sampling rate of the control device by means of discrete integration using the following equations:

$$e_{ii}(t)=T_{sat,ii}(t)T_{Il,ii}(t)$$

$$E_{ii}(t)=E_{ii}(t-t_{sample})+K_i \cdot e_{ii}(t) \cdot t_{sample}$$

$$T_{Il,ii}(t+t_{sample})=E_{ii}(t)+T_{CAT}(t)$$

where $t_{sample}$ is dependent on the sampling frequency or sampling rate and accordingly corresponds to the time period between two sampling times of the sampling rate of the control device 22.

The ambient air temperature $T_{KBI}$ is in each case a measurement variable of the sensor 23. The inflation air temperatures $T_{CAT,FL}$, $T_{CAT,FR}$, $T_{CAT,RL}$ and $T_{CAT,RR}$ provided are also each measurement variables of the sensors 24. The vehicle movement dynamics variables of longitudinal acceleration $a_x$, lateral acceleration $a_y$ and velocity $v_F$ can be measured and/or calculated variables.

The control device 22 comprises means for carrying out the method according to aspects of the invention. These means are hardware-side means and control-side means. The hardware-side means are, in particular, data interfaces, for exchanging data with the assemblies which are involved in the execution of the method according to aspects of the invention, that is to say, for example, with the sensors 23, 24 shown in FIG. 2 and the vehicle movement dynamics system shown in FIG. 2, that is to say for receiving the temperatures from the sensors 23 and 24 and the vehicle movement dynamics variables from the vehicle movement dynamics system 25. Furthermore, the hardware-side means are a processor for data processing, as a function of the sampling rate of the processor, and a memory for storing data. The software-side means are program modules for carrying out the method according to aspects of the invention.

The temperature of the inner liner 17 of the respective tire 10 can be determined individually for each tire 10 in an easy and reliable way, specifically as a function of an ambient air temperature, as a function of inflation air temperatures of the tires 10 and as a function of vehicle movement dynamics variables such as the lateral acceleration, longitudinal acceleration and velocity of the motor vehicle.

What is claimed is:

1. A method for determining a temperature of an inner liner of a tire of a motor vehicle, said method comprising:

measuring an ambient temperature surrounding the motor vehicle;

measuring a temperature of an inflation air of the tire;

determining a saturation temperature of the inner liner of the tire as a function of the ambient temperature, as a function of the temperature of the inflation air of the tire and as a function of vehicle movement dynamics variables, determining the temperature of the inner liner of the tire by integration as a function of the determined saturation temperature of the inner liner of the tire.

2. The method as claimed in claim 1, wherein the saturation temperature of the inner liner of the tire is determined as a function of a current ambient air temperature, as a function of a current temperature of the inflation air of the tire as well as a function of a current longitudinal acceleration and a current lateral acceleration of the motor vehicle.

3. The method as claimed in claim 2, wherein the saturation temperature of the inner liner of the tire is also determined as a function of a current velocity of the motor vehicle.

4. The method as claimed in claim 1, wherein the saturation temperature of the inner liner of the tire is determined as a function of a sampling rate at each sampling time thereof, and the integration takes place discretely at each sampling time of the sampling rate in order to determine the temperature of the inner liner of the tire.

5. The method as claimed in claim 1, wherein the temperature of the inner liner of the tire is determined individually for each tire of the motor vehicle.

6. The method as claimed in claim 5, wherein the saturation temperature of the inner liner of the tire is determined in such a way that:

an axle-specific reference saturation temperature for the inner liners of the tires of the respective axle is determined as a function of the ambient temperature for each axle of the motor vehicle;

for each tire, a difference is determined between the respective axle-specific reference saturation temperature and a tire-specific inflation air temperature of the respective tire;

for each tire, said difference is offset against at least one variable, dependent on a longitudinal acceleration of the motor vehicle, a lateral acceleration of the motor vehicle and a velocity of the motor vehicle, for a determination of a weighted difference; and for each tire, said weighted difference is offset against the respective tire-specific inflation air temperature of the respective tire, in order to determine the saturation temperature of the inner liner of the respective tire.

7. The method as claimed in claim 6, wherein the integration for a difference between the saturation temperature of the inner liner of the respective tire and the temperature of the inner liner of the respective tire is carried out for each tire.

8. A control device for determining a temperature of an inner liner of a tire of a motor vehicle, said control device being configured to:

measure an ambient temperature surrounding the motor vehicle;

measure a temperature of an inflation air of the tire;

determine a saturation temperature as a function of the ambient temperature, as a function of the temperature of the inflation air of the tire and as a function of vehicle movement dynamics variables for the inner liner of the tire, and determine the temperature of the inner liner of the tire as a function of the calculated saturation temperature of the inner liner of the tire by integration.

* * * * *